United States Patent [19]

Jones

[11] Patent Number: 4,815,537

[45] Date of Patent: * Mar. 28, 1989

[54] METHOD FOR VISCOUS HYDROCARBON RECOVERY

[75] Inventor: Lloyd G. Jones, Dallas, Tex.

[73] Assignee: Mobil Oil Corporation, New York, N.Y.

[ * ] Notice: The portion of the term of this patent subsequent to Feb. 3, 2004 has been disclaimed.

[21] Appl. No.: 69,546

[22] Filed: Jul. 2, 1987

[51] Int. Cl.$^4$ .................. E21B 33/138; E21B 43/22
[52] U.S. Cl. ............................. 166/270; 166/273; 166/281; 166/295; 166/300
[58] Field of Search ............... 166/270, 273, 285, 300, 166/274, 294, 295, 281

[56] References Cited

U.S. PATENT DOCUMENTS

| | | | |
|---|---|---|---|
| 3,785,437 | 1/1974 | Clampitt et al. | 166/281 |
| 3,845,822 | 11/1974 | Clampitt et al. | 166/281 |
| 4,190,109 | 2/1980 | Barton, Jr. | 166/273 X |
| 4,343,363 | 8/1982 | Norton et al. | 166/281 |
| 4,475,593 | 10/1984 | Friedman | 166/281 |
| 4,640,357 | 2/1987 | Jones | 166/273 |

*Primary Examiner*—Bruce M. Kisliuk

*Attorney, Agent, or Firm*—Alexander J. McKillop; Charles J. Speciale; Lawrence O. Miller

[57] ABSTRACT

Improved sweep efficiency is obtained in an oil recovery process wherein oil is recovered from a subterranean, viscous oil containing formation having relatively highly permeable zones and relatively low permeability zones penetrated by at least one injection well and at least one spaced apart production well in fluid communication with a substantial portion of the formation. First, a predetermined amount of gel solution is injected into the formation at high pressure to deeply penetrate and plug the fracture face and highly permeable zones of the formation. Thereafter, a breaker material such as hydrochloric acid is injected into the formation at a low pressure to break the gel and displace it from the fracture face and highly permeable zones in the vicinity of the injection well thereby reestablishing injectivity into the formation in the vicinity of the injection well. Thereafter, a flooding agent such as carbon dioxide, steam or water is injected into the formation that displaces oil through the low permeability unswept zones of the formation and fluids including oil are recovered from the formation through the production well.

8 Claims, No Drawings

METHOD FOR VISCOUS HYDROCARBON RECOVERY

BACKGROUND OF THE INVENTION

In the recovery of oil from oil-bearing subsurface formations, it usually is possible to recover only minor portions of the original oil in place by the so-called primary recovery methods which utilize only the natural forces present in the formation. Thus, a variety of supplemental recovery techniques have been employed in order to increase the recovery of oil from subsurface formations. The most widely used supplemental recovery technique is waterflooding which involves the injection of water into an oil-bearing formation. As the water moves through the formation, it acts to displace oil therein to a production system composed of one or more wells through which the oil is recovered.

One difficulty often encountered in waterflooding operations is the relatively poor sweep efficiency of the aqueous flooding agent; that is, the injected aqueous agent tends to channel through certain portions of the formation as it travels from the injection system to the production system and to bypass other portions. Such poor sweep efficiency or macroscopic displacement efficiency may be due to a number of factors, such as differences in the mobilities of the injected aqueous agent and the displaced reservoir oil permeability variations within the formation which encourage preferential flow through some portions of the formation at the expense of other portions.

Various techniques have been proposed in order to improve the sweep efficiency of the injected aqueous agent and thus avoid premature breakthrough at one or more of the wells comprising the production system. The most widely used procedure involves the addition of thickening agents to the injected aqueous agent in order to increase the viscosity thereof and thus decrease its mobility to a value equal to or less than the mobility of the displaced oil, resulting in a "mobility ratio" of oil to water which is less than or equal to one. Many polymeric thickening agents have been proposed for use in such mobility control operations, see U.S. Pat. Nos. 3,085,063; 3,984,333; 3,969,592; 4,100,232; and 4,222,881.

Another procedure of recovering oil from subsurface oil-bearing formations is disclosed in U.S. Pat. No. 3,224,228 and involves alternately flooding the formation with gas and water. Gas is injected into a watered-out formation or the waterflooded portion of an existing waterflooding operation until a desired gas saturation exists in the reservoir. Water is then injected and the gas-water injection cycles repeated until the water-oil ratio becomes uneconomical. Other alternating gas-water injection methods are described in U.S. Pat. Nos. 3,525,395 and 3,529,396. The theory behind these alternating gas-water injection methods is that the gas would cause relative fluid mobility barriers in the permeable streaks such that the following water could flood out more of the oil zone. The problem with this theory had to do with the injected gas channeling so badly due to its low viscosity that the benefits to oil recovery were limited.

Applicant's U.S. Pat. No. 4,640,357 discloses a method for recovering oil from fractured or stratified subsurface formations wherein a first flooding agent having a high viscosity is injected into the formation to form a filtercake on the walls of the fractures or permeable streaks of the formation only in the near vicinity of the injection well. A second flooding agent having an inorganic thickener is injected deep into the formation to completely fill the thief zones provided by the fractures or permeable streaks of the formation between the injection and production wells. A first flushing agent is then injected to clear the fractures or permeable streaks of the formation only in the near vicinity of the injection well of the inorganic thickener. A second flushing agent having a breaker material is injected to remove the filtercake from the walls of the fractures or permeable streaks of the formation only the near vicinity of the injection well. A third flooding agent having a low viscosity is injected to flood the reservoir through the open pore spaces made available by the removal of the filtercake near the injection well. The third flooding agent preferentially floods through the previously unswept hydrocarbon-bearing formation matrix thereby improving sweep efficiency.

U.S. Pat. Nos. 4,098,337; 4,161,351 and 4,637,467 teach the use of polymers to plug or partially plug high permeability zones of viscous oil-containing subterranean formations. The polymers are injected into the formation and polymerized in-situ to partially or completely plug the highly permeable zones in the formation. U.S. Pat. No. 4,098,337 also discloses injecting aqueous solutions of polymer degrading materials such as hydrazine, sodium hypochlorite and like chemicals into the treated formation to restore some of the formation permeability.

The present invention is an improvement over previous processes in that it injects a gel solution at high pressure into the formation that deeply penetrates and plugs the highly permeable zones and fracture face of the formation followed by injecting a breaker material at low pressure that breaks the gel and displaces it from the fracture face and the highly permeable zones of the formation in the vicinity of the injection well thereby facilitating subsequent injection of a flooding agent to displace oil through the low permeable unswept zones of the formation.

SUMMARY OF THE INVENTION

The present invention is directed to a method for recovering oil from a subterranean, viscous oil-containing formation having high permeability zones and low permeability zones penetrated by at least one injection well and at least one production well in fluid communication with a substantial portion of the formation. In the first step, a predetermined amount of a gel solution is injected into the formation at high pressure via the injection well to deeply penetrate and plug the highly permeable zones and the fracture face of the formation between the injection and production wells. The amount of gel solution injected into the formation is the amount sufficient to plug the fracture face and the highly permeable zones to at least 10 to 70% of the distance between the injection and production wells. Suitable gel solutions include hydroxy ethyl cellulose or hydroxy propyl guar, preferably crosslinked gel solutions. Thereafter, a breaker material such as hydrochloric acid is injected into the formation at low pressure via the injection well to break the gel and displace it from the face of the fracture and the highly permeable zones in the vicinity of the injection well. Thereafter, a flooding agent such as water, steam or carbon dioxide is injected into the formation via the injection well which is diverted from the plugged, highly permeable zones and the fracture face into the low permeability zones of the formation and displaces fluids including oil which are recovered from the formation via the production well.

DESCRIPTION OF THE PREFERRED EMBODIMENTS

This invention relates to a method for recovering oil from highly permeable fractured or stratified subterranean, oil-containing formations with improved sweep efficiency. More particularly, the method is applied to a subterranean, permeable oil-containing formation penetrated by at least one injection well and at least one spaced-apart production well. The injection well and production wells are perforated to establish fluid communication with a substantial portion of the formation. The injection and production wells may be located and spaced from one another in any desired pattern or orientation. For example, the line drive pattern may be utilized in which a plurality of injection wells and a plurality of production wells are arranged in rows which are spaced from one another. Exemplary of other patterns which may be used are those wherein a plurality of production wells are spaced about a central injection well or, conversely, a plurality of injection wells spaced about a central producing well. Typical of such well arrays are the five-spot, seven-spot, nine-spot and 13-spot patterns. The above and other patterns for effecting secondary recovery operations which may be applied in using the present method are illustrated in U.S. Pat. No. 3,927,716 to Burdyn et al, the disclosure which is hereby incorporated by reference.

In flooding subterranean, viscous oil-containing formations having relatively high permeability zones and relatively low permeability zones, the initial flooding often bypasses much of the hydrocarbon (i.e., gas, oil/gas or condensate) bearing formation matrix because the high permeability zones and created fracture faces in the formation provide preferred paths for the flooding agent to move through the formation thereby resulting in incomplete displacement of the oil from the formation. The present invention is directed to a method for plugging such fracture faces and highly permeable zones and reestablishing injectivity into the formation in the vicinity of the injection well whereby subsequent injection of a flooding agent is more effectively diverted through the low permeability unswept zones of the oil-containing formation thereby resulting in more complete displacememt of oil from the formation.

In the first step of the invention, a gel solution, preferably a crosslinked gel solution, is injected into the formation via the injection well at high injection pressures to deeply penetrate and plug the fracture face and the highly permeable zones in the formation, preferably to at least 10 to 70% of the distance between the injection and production wells. Suitable gel solutions include hydroxy ethyl cellulose or hydroxy propyl guar, preferably crosslinked gel solutions. Thereafter, a predetermined amount of a breaker material such as hydrochloric acid is injected into the formation at low pressure via the injection well to break the gel and displace it from the fracture face and the highly permeable zones in the near vicinity of the injection well. Thereafter, a flooding agent is injected into the formation via the injection well which is diverted from the plugged fracture face and highly permeable zones into the low permeability unswept zones of the formation thereby displacing fluids including oil through the formation and recovering oil from the formation via the production well. The flooding agent can be any fluid which effectively displaces crude oil from the formation, e.g., it can be an immiscible, miscible, or miscible-like flooding agent such as steam, water, carbon dioxide or an alternating water/gas injection scheme. Breaking and displacing the gel from the fracture face and the highly permeable zones in the vicinity of the injection well reestablishes injectivity into the formation in the vicinity of the injection well thereby facilitating subsequent injection of a driving fluid.

While a preferred embodiment of the method of the present invention has been described and illustrated, numerous modifications or alterations may be made without departing from the spirit and scope of the invention as set forth in the appended claims.

I claim:

1. A method for recovering hydrocarbons from a subterranean, viscous oil-containing formation having relatively high permeability zones, fractured zones and relatively low permeability zones penetrated by at least one injection well and at least one production well in fluid communication with a substantial portion of the formation comprising the sequential steps of:
   (a) injecting a gel solution into said formation to penetrate at least 10 to 70% of the distance between the injection and production wells and plug the face of the fractured zones and high permeability zones of said formation;
   (b) injecting a breaker material into said formation to break and displace the gel from the face of the fractured zones and high permeability zones in the vicinity of the injection well thereby reestablishing injectivity into the formation in the vicinity of the injection well; and
   (c) injecting a flooding agent into the formation via the injection well that displaces oil through the low permeability unswept zones of the formation via the production well.

2. The method of claim 1 wherein said breaker material is hydrochloric acid.

3. The method of claim 1 wherein said flooding agent is a miscible gas.

4. The method of claim 3 wherein said miscible gas is carbon dioxide.

5. The method of claim 1 wherein the flooding agent is steam.

6. The method of claim 1 wherein the flooding agent is water.

7. The method of claim 1 wherein the gel solution is selected from the group consisting of hydroxy ethyl cellulose and hydroxyl propyl guar.

8. The method of claim 7 wherein the gel solution is crosslinked.

* * * * *